(12) United States Patent
Patraucean et al.

(10) Patent No.: US 12,175,737 B2
(45) Date of Patent: Dec. 24, 2024

(54) REINFORCEMENT LEARNING FOR ACTIVE SEQUENCE PROCESSING

(71) Applicant: DEEPMIND TECHNOLOGIES LIMITED, London (GB)

(72) Inventors: Viorica Patraucean, London (GB); Bilal Piot, London (GB); Joao Carreira, St. Albans (GB); Volodymyr Mnih, Toronto (CA); Simon Osindero, London (GB)

(73) Assignee: DeepMind Technologies Limited, London (GB)

( * ) Notice: Subject to any disclaimer, the term of this patent is extended or adjusted under 35 U.S.C. 154(b) by 421 days.

(21) Appl. No.: 17/773,789

(22) PCT Filed: Nov. 13, 2020

(86) PCT No.: PCT/EP2020/082041
§ 371 (c)(1),
(2) Date: May 2, 2022

(87) PCT Pub. No.: WO2021/094522
PCT Pub. Date: May 20, 2021

(65) Prior Publication Data
US 2022/0392206 A1 Dec. 8, 2022

Related U.S. Application Data

(60) Provisional application No. 62/971,877, filed on Feb. 7, 2020, provisional application No. 62/936,315, filed on Nov. 15, 2019.

(51) Int. Cl.
*G06V 10/82* (2022.01)
*G06N 3/045* (2023.01)
*G06N 3/048* (2023.01)

(52) U.S. Cl.
CPC ............. *G06V 10/82* (2022.01); *G06N 3/045* (2023.01); *G06N 3/048* (2023.01)

(58) Field of Classification Search
None
See application file for complete search history.

(56) References Cited

U.S. PATENT DOCUMENTS 11,354,509 B2 * 6/2022 Hermann ............. G06N 3/0895
11,463,457 B2 * 10/2022 Bazalgette ............. G06N 20/00
(Continued)

FOREIGN PATENT DOCUMENTS

| WO | WO 2018/224471 | 12/2018 | |
| WO | WO-2018224471 A1 * | 12/2018 | ............. G06F 17/16 |
| WO | WO 2019/155065 | 8/2019 | |

OTHER PUBLICATIONS

Akkaya et al., "Solving rubik's cube with a robot hand," CoRR, Oct. 16, 2019, arxiv.org/abs/1910.07113, 51 pages.
(Continued)

*Primary Examiner* — Anand P Bhatnagar
(74) *Attorney, Agent, or Firm* — Fish & Richardson P.C.

(57) ABSTRACT

A system that is configured to receive a sequence of task inputs and to perform a machine learning task is described. The system includes a reinforcement learning (RL) neural network and a task neural network. The RL neural network is configured to: generate, for each task input of the sequence of task inputs, a respective decision that determines whether to encode the task input or to skip the task input, and provide the respective decision of each task input to the task neural network. The task neural network is configured to: receive the sequence of task inputs, receive, from the RL neural network, for each task input of the sequence of task inputs, a respective decision that determines whether to encode the task input or to skip the task input, process each of the un-skipped task inputs in the
(Continued)

sequence of task inputs to generate a respective accumulated feature for the un-skipped task input, wherein the respective accumulated feature characterizes features of the un-skipped task input and of previous un-skipped task inputs in the sequence, and generate a machine learning task output for the machine learning task based on the last accumulated feature generated for the last un-skipped task input in the sequence.

31 Claims, 4 Drawing Sheets

(56) References Cited

U.S. PATENT DOCUMENTS

| | | | | |
|---|---|---|---|---|
| 11,526,808 | B2* | 12/2022 | Etkin | G16H 30/40 |
| 11,816,591 | B2* | 11/2023 | Macglashan | G06N 20/00 |
| 2019/0287012 | A1* | 9/2019 | Celikyilmaz | G06F 16/345 |
| 2020/0293041 | A1* | 9/2020 | Palanisamy | G06N 3/08 |
| 2020/0401938 | A1* | 12/2020 | Etkin | G06N 5/022 |
| 2021/0110115 | A1* | 4/2021 | Hermann | G06N 3/045 |

OTHER PUBLICATIONS

Atkeson et al., "Robot learning from demonstration," ICML, 1997, 97:12-20.
Ba et al., "Multiple object recognition with visual attention," CoRR, Dec. 2014, arxiv.org/abs/1412.7755, 10 pages.
Barreto et al., "Successor features for transfer in reinforcement learning," Advances in Neural Information Processing Systems 30, 2017, pp. 4055-4065.
Bengio et al., "Estimating or propagating gradients through stochastic neurons for conditional computation," CoRR, Aug. 2013, arxiv.org/abs/1308.3432, 12 pages.
Bruce et al., "Saliency based on information maximization," Advances in neural information processing systems 18, 2005, pp. 155-162.
Campos et al., "Skip RNN: Learning to skip state updates in recurrent neural networks," CoRR, Aug. 22, 2017, arxiv.org/abs/1708.06834, 17 pages.
Carreira et al., "A short note about kinetics-600," CoRR, Aug. 3, 2018, arxiv.org/abs/1808.01340, 6 pages.
Carreira et al., "Quo vadis, action recognition? A new model and the kinetics dataset," Proceedings of the IEEE Conference on Computer Vision and Pattern Recognition (CVPR), Jul. 2017, pp. 4724-4733.
Carreira et al., "The kinetics human action video dataset," CoRR, May 19, 2017, arXiv:1705.06950, 22 pages.
Cheng et al., "Geometry-aware recurrent neural networks for active visual recognition," Advances in Neural Information Processing Systems 31 (NeurIPS 2018), 2018, 11 pages.
Cho et al., "Learning phrase representations using rn encoder decoder for statistical machine translation," CoRR, Jun. 3, 2014, arxiv.org/abs/1406.1078, 15 pages.
Courbariaux et al., "Binarized neural networks: Training deep neural networks with weights and activations constrained to+ 1 or−1," CoRR, Feb. 9, 2016, arXiv:1602.02830, 11 pages.
Deng et al., "Imagenet: A large-scale hierarchical image database," 2009 IEEE Conference on Computer Vision and Pattern Recognition, Jun. 20-25, 2009, pp. 248-255.
Everingham et al., "The pascal visual object classes (VOC) challenge," International Journal of Computer Vision, Sep. 9, 2009, 8(2):303-338.
Feichtenhofer et al., "Slowfast networks for video recognition," CoRR, Dec. 10, 2018, arxiv.org/abs/1812.03982, 10 pages.
Graves, "Adaptive computation time for recurrent neural networks," CoRR, Mar. 29, 2016, arxiv.org/abs/1603.08983, 19 pages.
Graves, "Long short-term memory," Supervised Sequence Labelling with Recurrent Neural Networks, Jan. 1, 2012, pp. 37-45.
Gregor et al., "Draw: A recurrent neural network for image generation," Proceedings of the 32nd International Conference on Machine Learning, 2015, 37:1462-1471.
Gu et al., "AVA: A video dataset of spatio-temporally localized atomic visual actions," CoRR, May 23, 2017, arxiv.org/abs/1705.08421, 15 pages.
Han et al., "Deep compression: Compressing deep neural networks with pruning trained quantization and huffman coding," CoRR, Oct. 1, 2015, arXiv:1510.00149, 14 pages.
He et al., "Deep residual learning for image recognition," Proceedings of the IEEE Conference on Computer Vision and Pattern Recognition (CVPR), 2016, pp. 770-778.
Heilbron et al., "What do I Annotate Next? An Empirical Study of Active Learning for Action Localization," Proceedings of the European Conference on Computer Vision, 2018, pp. 199-216.
Hinton et al., "Distilling the knowledge in a neural network," CoRR, Mar. 9, 2015, arXiv:1503.02531, 9 pages.
International Preliminary Report on Patentability in International Appln. No. PCT/EP2020/082041, dated May 17, 2022, 9 pages.
International Search Report and Written Opinion in International Appln. No. PCT/EP2020/082041, dated Feb. 23, 2021, 11 pages.
Jaafra et al., "Robust reinforcement learning for autonomous driving," ICLR 2019 Workshop on Deep RL Meets Structured Prediction, 2019, 9 pages.
Jayaraman et al., "Learning to look around: Intelligently exploring unseen environments for unknown tasks," 2018 IEEE/CVF Conference on Computer Vision and Pattern Recognition, 2018, pp. 1238-1247.
Karpathy et al., "Large-scale video classification with convolutional neural networks," Proceedings of the 2014 IEEE Conference on Computer Vision and Pattern Recognition (CVPR), 2014, pp. 1725-1732.
Koch et al., "A model of saliency-based visual attention for rapid scene analysis," IEEE Transactions on Pattern Analysis & Machine Intelligence, Nov. 1998, (11):1254-1259.
Larochelle et al., "Learning to combine foveal glimpses with a third-order boltzmann machine," Advances in neural information processing systems 23, 2010, 9 pages.
Li, "Deep Reinforcement Learning: An Overview," CoRR, Jan. 2017, arxiv.org/abs/1701.07274, 85 pages.
Lin et al., "Microsoft COCO: Common objects in context," European Conference on Computer Vision, 2014, 15 pages.
Mahasseni et al., "Budget-aware activity detection with A recurrent policy network," British Machine Vision Conference, BMVC 2018, Sep. 3-6, 2018, 12 pages.
Malinowski et al., "Learning visual question answering by bootstrapping hard attention," Proceedings of the European Conference on Computer Vision (ECCV), 2018, pp. 3-20.
Mathe et al., "Reinforcement learning for visual object detection," The IEEE Conference on Computer Vision and Pattern Recognition (CVPR), Jun. 2016, pp. 2894-2902.
Mirowski et al., "Learning to navigate in cities without a map," Neural Information Processing Systems 31 (NeurIPS), 2018, 12 pages.
Mnih et al., "Asynchronous methods for deep reinforcement learning," Proceedings of the 33rd International Conference on International Conference on Machine Learning, 48:1928-1937.
Mnih et al., "Recurrent models of visual attention," Proceedings of the 27th International Conference on Neural Information Processing Systems, Dec. 2014, 2:2204-2212.
Mnih, "Human-level control through deep reinforcement learning," Nature, Feb. 26, 2015, 518(7540):529-533.
Monfort et al., "Moments in time dataset: one million videos for event understanding," IEEE Transactions on Pattern Analysis and Machine Intelligence, Feb. 24, 2019, 42(2):502-508.
Nakano et al., "Blink-related momentary activation of the default mode network while viewing videos," Proceedings of the National Academy of Sciences, Dec. 24, 2012, 110(2):702-706.
Pomerleau, "Alvinn: An autonomous land vehicle in a neural network," Advances in Neural Information Processing Systems, 1989, pp. 305-313.

(56) References Cited

OTHER PUBLICATIONS

Possas et al., "Egocentric activity recognition on a budget," 2018 IEEE/CVF Conference on Computer Vision and Pattern Recognition, 2018, pp. 5967-5976.
Ramakrishnan et al., "Sidekick policy learning for active visual exploration," Computer Vision—ECCV 2018: 15th European Conference, Sep. 2018, pp. 424-442.
Savva et al., "Habitat: A platform for embodied AI research," Proceedings of the IEEE/CVF International Conference on Computer Vision (ICCV), 2019, pp. 9339-9347.
Schmidhuber et al., "Learning to generate artificial fovea trajectories for target detection," International Journal of Neural Systems, 1991, 2(01n02):135-141.
Schmitt et al., "Kickstarting deep reinforcement learning," CoRR, Mar. 10, 2018, arXiv:1803.03835, 9 pages.
Seifi et al., "Where to look next: Unsupervised active visual exploration on 360 input," CoRR, Sep. 23, 2019, arxiv.org/abs/1909.10304, 4 pages.
Shibata et al., "Active perception and recognition learning system based on actor-q architecture," Advances in Systems and Computers in Japan, Oct. 23, 2002, 33(14):12-22.
Soomro et al., "Ucf101: A dataset of 101 human actions classes from videos in the wild," CoRR, Dec. 3, 2012, arxiv.org/abs/1212.0402, 7 pages.
Srivastava et al., "Dropout: A simple way to prevent neural networks from overfitting," J. Mach. Learn. Res., 2014, 15(1):1929-1958.
Srivastava et al., "Unsupervised learning of video representations using lstms," Proceedings of the 32nd International Conference on International Conference on Machine Learning, 2015, 37:843-852.
Strub et al., "End-to-end optimization of goal-driven and visually grounded dialogue systems Harm de Vries," International Joint Conference on Artificial Intelligence, Aug. 2017, pp. 2765-2771.
Taylor et al., "Transfer learning for reinforcement learning domains: A survey," J. Mach. Learn. Res., Dec. 2009, 10:1633-1685.
Vaswani et al., "Attention is all you need," Advances in Neural Information Processing Systems 30, 2017, pp. 5998-6008.
Williams et al., "Simple statistical gradient-following algorithms for connectionist reinforcement learning," Mach. Learn., May 1992, 8(3-4):229-256.
Wong-Riley et al., "Energy metabolism of the visual system," Eye and Brain, 2010, pp. 99-116.
Xu et al., "Show, attend and tell: Neural image caption generation with visual attention," Proceedings of the 32nd International Conference on International Conference on Machine Learning, 2015, 37:2048-2057.
Yeung et al., "End-to-end learning of action detection from frame glimpses in videos," Proceedings of the IEEE Conference on Computer Vision and Pattern Recognition (CVPR), 2016, pp. 2678-2687.
Zhou et al., "Places: A 10 million image database for scene recognition," IEEE Transactions on Pattern Analysis and Machine Intelligence, 40(6):1452-1464.

* cited by examiner

REINFORCEMENT LEARNING FOR ACTIVE SEQUENCE PROCESSING

CROSS-REFERENCE TO RELATED APPLICATIONS

This application is a National Stage Application under 35 U.S.C. § 371 and claims the benefit of International Application No. PCT/EP2020/082041, filed Nov. 13, 2020, which claims priority to U.S. Provisional Application No. 62/936,315, filed on Nov. 15, 2019 and to U.S. Provisional Application No. 62/971,877 filed Feb. 7, 2020. The disclosure of each of the prior applications is considered part of and is incorporated by reference in the disclosure of this application.

BACKGROUND

This specification relates to a neural network system that processes a sequence of task inputs to generate a task output in order to perform a machine learning task.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that is configured to process a sequence of task inputs to generate a task output in order to perform a machine learning task.

For example, the sequence of task inputs is a sequence of video frames and the machine learning task is to recognize one or more actions performed in the sequence of video frames. The sequence of video frames can come from large datasets of real video sequences. The actions can be, for example, actions performed by humans such as dancing, swimming, running, and playing guitar. As another example, the sequence of task inputs can be a sequence of video frames and the machine learning task can be a different video processing task, e.g. to predict the topic of the sequence of video frames or to recognize an object depicted in the sequence of video frames.

As another example, the machine learning task is a natural language processing task where the sequence of task inputs is a sequence of text and the task output is a prediction of a topic of the sequence of text, a sentiment expressed in the sequence of text, or another output for another natural language processing task. As a further example, the machine learning task is a speech processing task where the sequence of task inputs is a sequence of voice inputs (e.g. audio samples captured in successive respective time windows) and the task output is prediction of the topic of the sequence of voice inputs, a sentiment expressed in the sequence of voice inputs, transcription of the voice input or another output for another speech processing task.

The system aims to generate an accurate task output (e.g., to accurately recognize actions performed in the sequence of video frames) while processing as few task inputs as possible in order to reduce computational costs. To achieve this goal, the system includes a trained reinforcement learning (RL) neural network and a trained task neural network.

The RL neural network is configured to generate, for each task input of the sequence of task inputs, a respective decision that determines whether to encode the task input or to skip the task input, and to provide the respective decision of each task input to the task neural network.

The task neural network is configured to receive the sequence of task inputs and to receive, from the RL neural network, for each task input of the sequence of task inputs, a respective decision that determines whether to encode the task input or to skip the task input. For each of the un-skipped task inputs in the sequence, the task neural network generates a respective accumulated feature for the un-skipped task input. The respective accumulated feature, which may be a vector having multiple components, characterizes features of the un-skipped task input and of any previous un-skipped task inputs in the sequence (i.e. in the case of the first un-skipped task input, the only task input which the corresponding accumulated feature characterizes is the first un-skipped task input). Once all of the task inputs in the sequence have been processed, the task neural network generates a machine learning task output for the machine learning task based on the last accumulated feature generated for the last un-skipped task input in the sequence.

The task neural network can, alternatively, for each of the un-skipped task inputs, generate a temporary machine learning output based on the respective accumulated feature and generate a machine learning task output for the machine learning task by averaging the temporary machine learning outputs generated for the un-skipped task inputs in the sequence.

More specifically, the task neural network includes an encoder, an accumulated feature neural network, and a final neural network.

For each of the un-skipped task inputs, the encoder is configured to process the current un-skipped task input to generate an encoded feature representation for the current un-skipped task input, and to provide the encoded feature representation to the accumulated feature neural network. The encoder can be a convolutional neural network.

For each of the un-skipped task inputs, the accumulated feature neural network is configured to: process the encoded feature representation of the current un-skipped task input and a previous accumulated feature associated with the previous un-skipped task input to generate a respective accumulated feature for the current un-skipped task input, generate a feature output from the respective accumulated feature of the current un-skipped task input, and provide the feature output to the RL neural network, the recurrent neural network output being used by the RL neural network to generate a next decision for the next un-skipped task input in the sequence. The feature output may include a time embedding that identifies the current time step.

The final neural network is configured to process the last accumulated feature to generate the machine learning task output for the machine learning task. The final neural network can be a multilayer perceptron (MLP) neural network.

For each of the un-skipped task inputs in the sequence, the RL neural network is configured to receive, from the task neural network, the feature output generated by the accumulated feature neural network, and to generate a next decision for the next task input in the sequence. For each of the skipped task inputs in the sequence (except any task inputs prior to the first task input which the RL neural network decides not to skip), the RL neural network is configured to receive, from the task neural network, the feature output generated by the accumulated feature neural network for the most recent un-skipped task input, and to generate a next decision for the next task input after the skipped task input in the sequence. For any task inputs prior to the first task input which the RL neural network decides not to skip, the RL neural network may receive a default feature output.

The RL neural network maintains an action space that includes an encode action and a skip action. The RL neural network is configured to, for each task input in the sequence: process, using a policy neural network of the RL neural network, the received feature output to generate a corresponding distribution of actions in the action space, and generate the next decision for the next task input in the sequence by sampling an action from the action space according to the corresponding distribution of actions.

The RL neural network is configured to receive a reward for making the next decision for the next task input. The reward for the skip action is greater than the reward for the encode action. For example, to encourage a frugal behavior in terms of data consumed per task, the RL neural network can be configured to receive a negative reward (e.g., a penalty) every time it decides to encode a task input.

In some implementations where the number of task inputs (e.g., number of video frames) that can be consumed is fixed in advance, the RL neural network needs to choose carefully which task inputs to encode within the given fixed computational budget. In these implementations, the RL neural network may not receive negative rewards from the RL environment at every encoded task input. Instead, the system can count the encoded task inputs and truncate the sequence of task inputs when the fixed budget is reached.

The RL neural network and the task neural network are jointly trained to minimize a loss objection function using a stochastic gradient descent method. Gradients from the RL neural network are not back-propagated into the task neural network. The stochastic gradient descent method can be REINFORCE. The loss objective function includes: (i) a first component that is a cross entropy loss of a ground-truth machine learning task output and a predicted machine learning task output and that measures how well the task neural network is predicting the ground-truth machine learning task output, (ii) a second component that is the expected sum of rewards collected by the RL neural network, and (iii) a third component that is an action exploration entropy.

Particular embodiments of the subject matter described in this specification can be implemented so as to realize one or more of the following advantages. By using a reinforcement learning (RL) neural network to make a decision to skip unnecessary task inputs (e.g., video frames) when processing a sequence of task inputs, the neural network system described in this specification can accomplish a machine learning task (e.g., recognizing an action performed in a sequence of video frames) while minimizing computational costs, i.e., by processing as few task inputs as possible. In particular, the RL neural network interacts with an RL environment and can choose to encode or skip task inputs: encoding task inputs comes with a cost, whereas skipping is free. At the end of the sequence, the system uses an accumulated representation generated by a task neural network to predict a task output in order to fulfill the machine learning task. The RL neural network and the task neural network are jointly trained to optimize an objective function that is based on the accuracy of the prediction and the cost of encoding task inputs, in which gradients from the RL neural network are not back-propagated into the task neural network and vice versa. These techniques allow the system to achieve similar or better performance (e.g., more accurate prediction) on the machine learning task while reducing computational costs by consuming only a fraction of the task inputs, compared to existing systems that consume all of the task inputs. That is, using the RL neural network at each time step and the task neural network for only the un-skipped time step reduces computational costs compared to running all of the components for all of the time steps.

Certain novel aspects of the subject matter of this specification are set forth in the claims below, accompanied by further description.

BRIEF DESCRIPTION OF THE DRAWINGS

Like reference numbers and designations in the various drawings indicate like elements.

DETAILED DESCRIPTION

Figure 1:
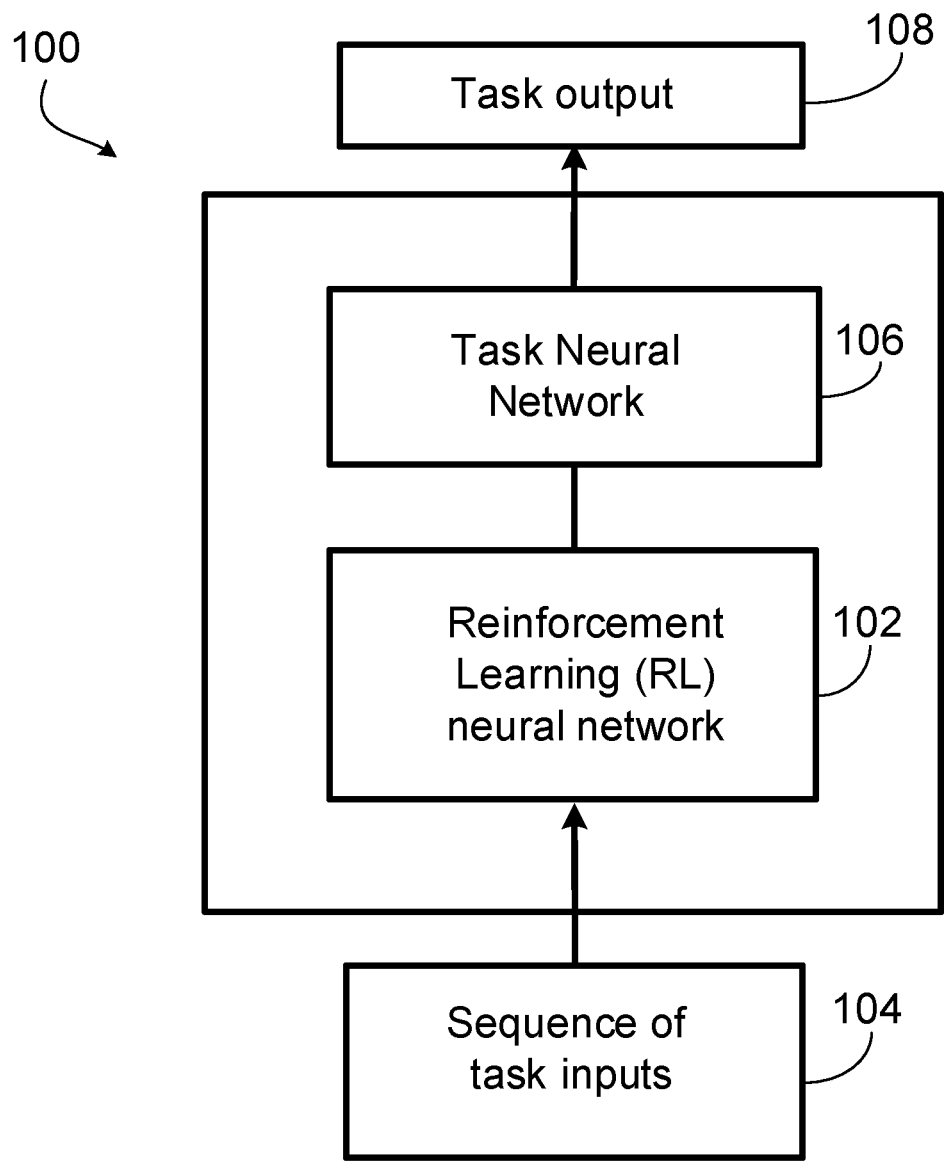
FIG. 1 shows an example neural network system for active sequence processing.

FIG. 1 shows an example neural network system 100 for active sequence processing. The system 100 is an example of a system implemented as a computer program on one or more computers in one or more locations, in which the systems, components, and techniques below can be implemented.

The neural network system 100 may be configured to receive a sequence of task inputs 104 and to perform a machine learning task. The sequence of tasks may be processed more efficiently by exploiting temporal redundancy in the sequence. The sequence of task inputs 104 may each be real-world data collected by at least one sensor, such as a sequence of video frames (a "video") captured by one or more video cameras, and the machine learning task may be to recognize one or more actions performed in the sequence of video frames. For example, the sequence of video frames may be a sequence of video frames of a human performing an activity and the task may be to identify the activity. The cost of perception may be explicitly modelled to process the sequence of task inputs 104 more efficiently. For example a reinforcement learning environment may be created from a sequence of video frames while minimizing perception cost to process as few frames as possible.

An example where the sequence of tasks inputs 104 is a sequence of video frames will be used to exemplify the operation of the neural network system described herein. However, the machine learning task may alternatively, be a different kind of machine learning task that operates on a sequence of inputs e.g. a speech recognition task (in this case, the task inputs may be derived from successive audio samples of a speech waveform collected by a microphone at respective times; optionally, the audio samples may be data in the time domain and/or in the frequency domain, such as Short-time Fourier transforms (STFT) of successive time windows of the speech waveform), a keyword detection task, or other machine learning task.

The system 100 may process multiple sequences of video frames (i.e. multiple videos) successively. The system 100 attempts to classify each video with a respective class label y while consuming as few frames as possible. For example, when the task is action recognition, the class labels may include, for example, labels for actions from a set of actions, e.g. dancing, swimming, playing guitar etc. In this case, the class label assigned to a given video to indicate the action shown in the video is termed an "activity class label". At the end of each video the system 100 can use an accumulated representation to predict the activity class label y. The task may be modelled as a Markov Decision Process (MDP).

The system 100 includes a reinforcement learning (RL) neural network 102. The RL neural network 102 is configured to generate for each task input 104 a respective decision about whether to encode the task input or skip the task input. The RL neural network 102 provides the respective decision for each task input to a task neural network 106.

The task neural network 106 is configured to receive from the RL neural network 102, for each task input in the sequence of task inputs 104, a respective decision that determines whether to encode the task input or to skip the task input. The task neural network 106 is further configured to process each of the un-skipped task inputs, i.e., each of the task inputs for which the decision is to encode the task input in the sequence of task inputs to generate a respective accumulated feature for the un-skipped task input. In some implementations generating a respective accumulated feature includes computing a hidden representation of each un-skipped task. The hidden representation can be integrated over time. The respective accumulated feature for a given un-skipped task input characterizes features of the un-skipped task input and of any previous un-skipped task inputs in the sequence.

In a first implementation the task neural network 106 may be further arranged to generate a machine learning task output 108 for the machine learning task based on the last accumulated feature generated for the last un-skipped task input in the sequence. In a different implementation, the task neural network 106 may be arranged to generate a temporary machine learning output based for each un-skipped task input on the respective accumulated feature and generate a machine learning task output 108 for the machine learning task by averaging the temporary machine learning outputs generated for the un-skipped task inputs in the sequence. That is, each temporary machine learning output is an output that is of the type that is required for the machine learning task and is referred to as "temporary" because the output is generated before the entire sequence has been processed.

In some implementations, to generate a machine learning task output 108 for the machine learning task, the task neural network 106 generates an output that specifies one or more labels that identify an activity.

Figure 2:
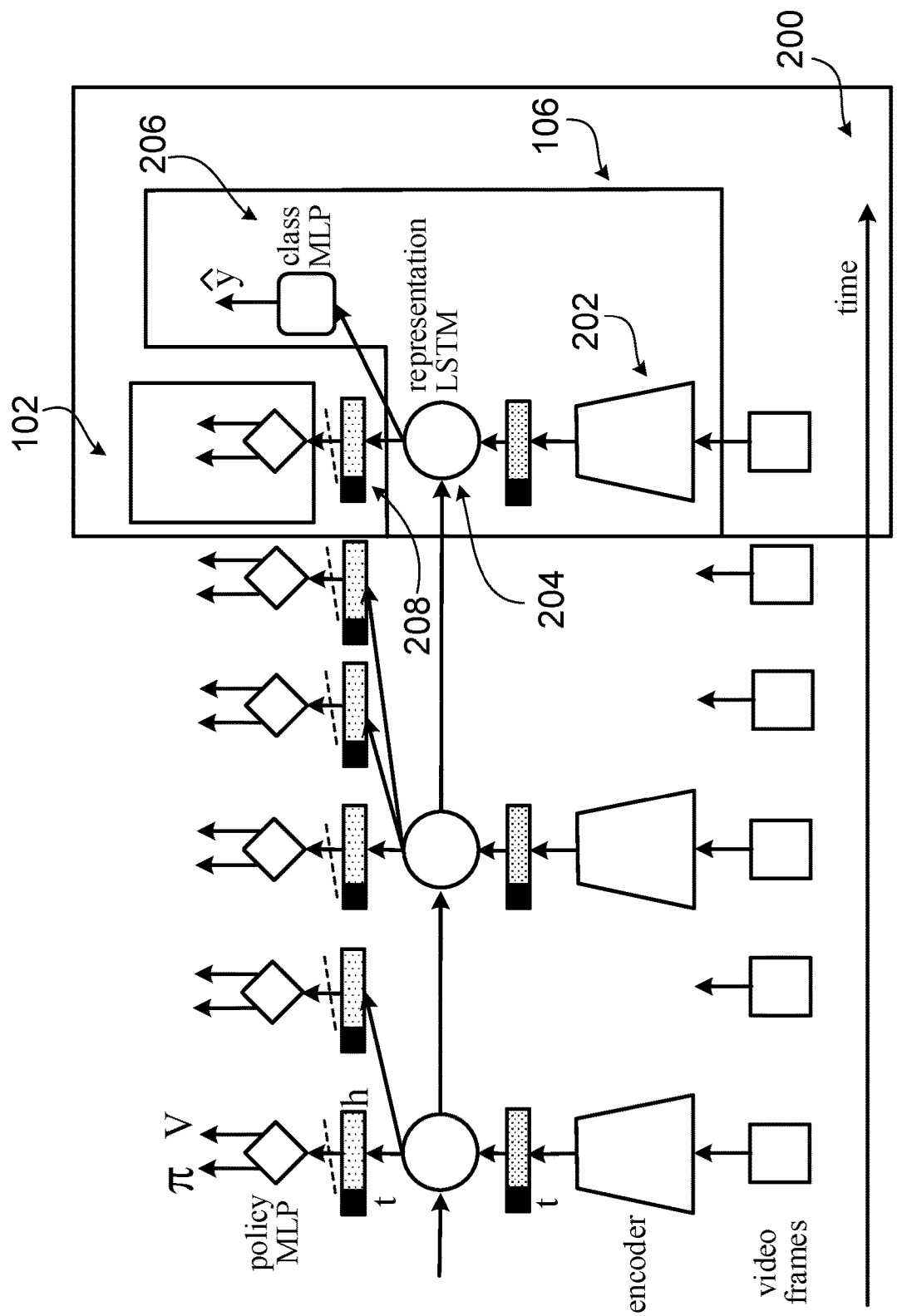
FIG. 2 shows further details of an example neural network system.

FIG. 2 shows a further details of an example neural network system 200 for active sequence processing.

FIG. 2 is an example of a system implemented as a computer program on one or more computers in one or more locations, in which the systems, components, and techniques below can be implemented. The system 200 includes the RL neural network 102 and the task neural network 106

In some implementations the task neural network 106 may further include an encoder 202, an accumulated feature neural network 204, and a final neural network 206.

The encoder 202 is configured to process the current un-skipped task input to generate an encoded feature representation for the current un-skipped task input. In some implementations the encoder 202 may be a convolutional neural network (CNN). Generally, the encoder 202 can have any neural network architecture that allows the encoder 202 to process a task input, e.g., a video frame, an embedding of a word or other piece of text (e.g. the output of a further neural network (not shown) which receives the word or other piece of text), or features of an audio sample, to generate a lower-dimensional representation of the task input.

The encoder 202 provides the encoded feature representation to an accumulated feature neural network 204. In some implementations the accumulated feature neural network may be a recurrent neural network (RNN), for example, a long-term short-term memory (LSTM). The accumulated feature neural network 204 is configured to, for each of the un-skipped task inputs, process the encoded feature representation of the current un-skipped task input and a previous accumulated feature associated with the previous un-skipped task input to generate a respective accumulated feature for the current un-skipped task input.

In some implementations, the accumulated feature neural network 204 is configured to generate a temporary machine learning output based on the respective accumulated feature and, once the entire sequence has been processed, generate a machine learning task output 108 for the machine learning task by combining the respective temporary machine learning outputs generated for the un-skipped task inputs in the sequence, such as by averaging the temporary machine learning outputs generated for the un-skipped task inputs in the sequence. Alternatively, the most common (modal) temporary machine learning output might be identified and assigned as the machine learning task output 108.

The accumulated feature neural network 204 also generates for each un-skipped task input a corresponding feature output, which is also a vector having one or more components (typically multiple components). The accumulated feature neural network 204 may generate this based on the respective accumulated feature. The encoder 202 can further use the feature output from the respective accumulated feature of the current un-skipped task input and provide the feature output to the RL neural network 102. For example, a residual skip connection over the accumulated feature neural network can be applied, in which case the feature output is a concatenation of the encoder output with the accumulated feature of the current un-skipped task input.

The RL neural network can then use the feature output to generate a next decision for the next un-skipped task input in the sequence.

The encoder 202 and accumulated feature neural network 204 may run only when needed to encode information. For example, the encoder 202 and accumulated feature neural network 204 may not run for the task inputs which the RL neural network 102 indicates should be skipped, resulting in a saving of resources. In this case, the feature output supplied to the RL neural network 102 may remain the same until the RL neural network indicates that one of the sequence of task inputs should not be skipped. Note that when the RL neural network is generating a decision for all task inputs up to and including the first task input for which the RL neural network decides that the task input should be encoded, the RL neural network may receive a default feature output, which may be the same for all those task inputs.

The RL neural network 102 maintains an action space comprising an encode action and a skip action.

The RL neural network 102 is configured to, for each task input in the sequence process, use the received feature output to generate a corresponding distribution of actions in the action space, and generate the next decision for the next task input in the sequence by sampling an action from the action space according to the corresponding distribution of actions.

For each of the un-skipped task inputs in the sequence, the RL neural network 102 may be configured to receive, from the task neural network 104, the feature output 208 generated by the accumulated feature neural network, and to generate a next decision for the next task input in the sequence. For each of the skipped task inputs in the sequence, the RL neural network may be configured to receive, from the task neural network, the feature output generated by the accumulated feature neural network for the most recent un-skipped task input (e.g. a frame of the video sequence), and produce a probability distribution over possible next actions and by sampling from the distribution generate an encode or skip action generates a next decision for the next task input after the skipped task input in the sequence. That is, the RL neural network 102 can generate a first probability for the encode action and a second probability for the skip action and then sample either the encode action or the skip action based on the first or second probabilities.

In some implementations, to determine whether to encode or skip a frame may comprise the RL neural network 102 learns a policy π that takes as input the feature output 208 h of the accumulated feature neural network and produces a probability distribution over possible next actions. In some implementations sampling this distribution can be used to generate the next encode or skip action. The RL neural network 102 may run at the frame rate, i.e. may run for each task input, taking h as input. When frames are skipped h does not change and the policy neural network sees the same input. An embedding of the current time step can be added, so the RL network can keep track of the passage of time even when h does not change.

In some implementations the RL neural network 102 may be a Recurrent Neural Network (RNN), for example, a long short-term memory (LSTM).

During a training phase of the neural network system 200 (e.g. as described below with reference to FIG. 3), the RL neural network 102 may receive a reward for making the next decision for the task input. For example, the RL neural network 102 receives a reward of 0 for skipping the frame and −1 for encoding the frame. In some implementations the RL neural network 102 may optionally receive a reward based on the quality of the task output relative to the ground truth task output, for example if the task output is correctly labelled. In some implementations there is no (zero) net cost for skipping a frame. For example the RL neural network 102 may receive a negative reward for deciding to encode a frame. The reward for the skip action may typically be greater than the reward for the encode action.

The final neural network 206 may further be configured to process the last accumulated feature to generate the machine learning task output for the machine learning task. Outputs of the accumulated feature neural network 204 can be concatenated with the corresponding input through a skip connection. The concatenated inputs and outputs can be projected into the activity class space, obtaining class logits. The class logits can be averaged over time obtaining a distribution over the possible class labels $\hat{y} = \Sigma_{i=1}^{k} \text{class}_{MLP}(h_i)$. $h_i$ represents the concatenation between the encoder neural network output and the accumulated feature neural network output, at each un-skipped time step i. When using temporary outputs, these $h_i$ are passed through the class_MLP to obtain temporary logits, which are then averaged. When temporary outputs are not used, only $h_t$ corresponding to the last un-skipped step is passed through the class_MLP to obtain the logits. k denotes the number of encoded (i.e. un-skipped) task inputs and i represents the indices of the frames that were encoded. The indices may be sequential or non-sequential.

For example, the machine learning task output may be a class label or other classification. The final neural network 206 may be a multilayer perceptron (MLP) neural network.

Figure 3:
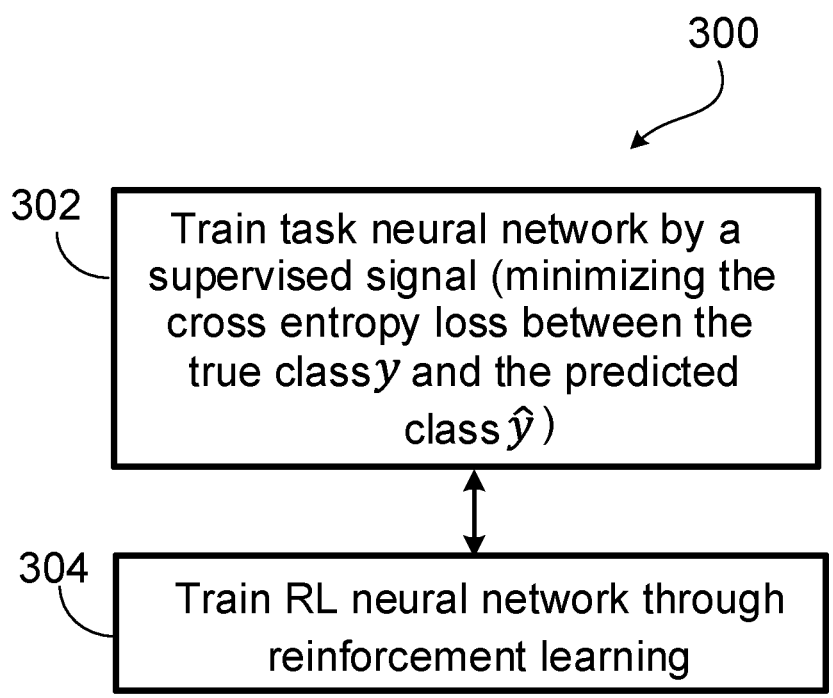
FIG. 3 is a flow diagram of an example process for training a machine learning system for active sequence processing.

FIG. 3 is a flow diagram of an example process 300 for training a machine learning system for active sequence processing. For convenience, the process 300 will be described as being performed by a system of one or more computers located in one or more locations. For example, a system including one or more neural networks for active sequence processing, appropriately programmed in accordance with this specification, can perform the process 300. For example, the system can be the neural network system for active sequence processing 100 of FIG. 1 or 200 of FIG. 2. The system jointly trains RL neural network and the task neural network to minimize a loss objective function using a stochastic gradient descent method in which gradients from the RL neural network 102 are not back-propagated into the task neural network. The system trains 302 the task neural network using a supervised signal (minimizing the cross entropy loss between the true class y and the predicted class ŷ).

The system trains 304 the RL neural network 102 through reinforcement learning. For example, a Markov Decision Process defined by the tuple (S, A, R, T) where S represents the set of states, A the set of possible actions, R the reward function, and T the transition model may be defined. The representation components may be considered as part of an environment $\varepsilon_w$, i.e. a parametric environment parametrized by w where w are the weights of the encoder and of the recurrent neural network accumulating the features, which get updated at each training iteration, changing the environment that the policy sees, and the policy as part the RL neural network. The set of states may be defined as $S \in R^d$, where d is the size of the accumulated feature neural network output (i.e. the feature output). The action space may be defined as A={encode, skip}. The policy $\pi_\theta$ may be given by the mapping $\pi_\theta: R^d \to$ {encode, skip} and is parameterized by the parameters θ of the RL neural network. In some implementations the transition model from $s_t$ to $s_{t+1}$ is deterministic and is defined as:

$$\{(h,t) \text{ encode} \to (h',t+1), (h,t) \text{ skip} \to (h,t+1), (h,N) \to e\}.$$

At the end of a video sequence (t=N), the system may transition automatically to an end-of-episode (e) state, irrespective of the action taken. The rewards are R={$r_{encode}$, $r_{skip}$, $r_{class}$}. $r_{class}$ is a reward the RL neural network can optionally receive dependent on the quality of the task output relative to the ground truth output. In some implementations it may by a hard reward (e.g. 1 if the classification is correct, 0 otherwise). In other implementations it may be a soft reward, equal to the normalized amplitude of the logit of the correct class.

During training, the RL neural network 102 learns a distribution of tasks using a training dataset of video sequences (e.g. for certain video sequences the task may be to classify the video sequence as a first action, and for other video sequences the task may be to classify the video sequence as a second, different action), wherein each task is determined by $(v_i, w_j)$ where $v_i$ is a video sequence from the dataset and $w_j$ are environment weights at the current training iteration, i.e. the parameters of the task neural network. At different training iterations the environment (e.g. the output of the task neural network) may look different for the same sequence sampled from the dataset because the parameters of the task neural network change during training. The parametric nature of the environment's dependence on the weights w differs from a classical RL network.

In some implementations the system trains 304 the RL neural network 102 based on an advantage-actor critic (A2C) approach. In an A2C approach the stochastic gradient decent method may be REINFORCE. The expected return of a policy $E_\pi[R_t]$, may be maximized by computing policy gradients using the REINFORCE algorithm to update the parameters θ. The empirical return $$R_t = \sum_{k=0}^{N-t} \gamma^k r_{t+k}$$

is the total discounted return accumulated by the RL neural network from time step t until the end of the episode (which has total length N), with discount factory $\gamma \in (0,1]$. The value of state s under policy π is defined as $V^\pi(s)=E_\pi[R_t|s_t=s]$ and represents the expected return for following policy π from state s. The expected return from each state $s_t$ can be maximized by the RL neural network. A REINFORCE likelihood-ratio trick may be used to update the parameters θ in the direction $\nabla_\theta \log \log \pi(s_t;\theta)R_t$, which is an unbiased estimate of $\nabla_\theta E_\pi[R_t]$.

In some implementations the training of the RL neural network may be unstable. This may be negated by learning a function of the state. This function of the state may be known as a baseline $b_t(s_t)$ which is subtracted from the return to reduce bias. Using a learnt estimate of the baseline (also known as a value function) the estimate of the gradient remains unbiased even after baseline subtraction. The new gradients are given by $\nabla_\theta \log \log \pi(\alpha_t|s_t;\theta)(R_t-V^\pi(s_t))$ where $A_t=R_t-V^\pi(s_t)$ may be considered as the advantage in terms of taking action $\alpha_t$ as compared to the average return.

Training 304 the neural network may include exploration of the state space. An entropy bonus can be added to the actions of the RL neural network during training. The entropy bonus may be given by:

$$G=-\Sigma_i p(\alpha_i)\log \log p(\alpha_i).$$

An entropy bonus may be used to increase the spread of action distribution, preventing the RL neural network from being too sure of taking any one action and helping exploration during learning. In some implementations the loss objective function may comprise: a first component that is a cross entropy loss of a ground-truth machine learning task output and a predicted machine learning task output and that measures how well the task neural network is predicting the ground-truth machine learning task output, a second component that is the expected sum of rewards collected by the RL neural network 102, and a third component that is an action exploration entropy. For example the loss objective function may be given by:

$$L = H(y, \hat{y}) - \sum_t \log \pi(s\_t; \theta)A\_t + \|R_t - V^\pi(s_t)\|_2^2 - \beta G_t$$

Where β is a fixed weight applied to the per-step action entropy cost term and $H(y,\hat{y})$ denotes the cross-entropy loss for the supervised classification.

At every training iteration a batch of sequences from the video dataset may be sampled. The sampled batches may be used to unroll the RL neural network 102 and collect trajectories. The action logits, action samples and value predictions given by the RL neural network together with the rewards at each step (including class predictions) may be used to compute the empirical returns $R_t$ as discounted cumulative sums of the rewards, for example with γ=0.99 and advantages. The gradients can further be computed and the policy updated.

In some implementations when the system trains 304 the RL neural network the number of video frames that can be consumed by the task neural network in any given sequence may be fixed in advance. The system selects which frames to consume within a given budget. Assuming a video sequence of length N, and a budget of k, there are less than nchoosek(N,k) possibilities. This may be described as a fixed, or limited, budget system. A fixed or limited budget constraint allows a user of the neural network system to strictly control resources. The number of encoded frames may be counted and the trajectories clipped when the budget is reached. The RL neural network may be constrained to reduce k below a perception cost. In other implementations clipping may be used without an encoding cost, so the RL neural network is allowed to consume k frames out of N without incurring a cost.

In other implementations the system may be allowed to consume any number of frames to achieve the task while paying a penalty for each consumed frame and aiming to achieve a reduction in the overall cost. The penalty is part of the reward structure used to train the RL network with REINFORCE. These per-step penalties are used to compute the total returns that get multiplied with the gradients of the policy. The returns become part of the loss policy. Assuming a video sequence of N frames there are $2^N$ possibilities in an example that has an unlimited budget.

In other implementations, the RL neural network 102 may be configured to predict how many more task inputs the task neural network needs to encode until an accuracy of a machine learning task output generated by the task neural network satisfies a threshold. In one example a pre-trained per-frame action classifier may be used to train the RL neural network. The classifier may output a score for each frame in the sequence. For example, for a given budget of k frames the frames with the top k confidence scores for the correct class among the classifier's predictions can be selected. The indices of these frames may be used to generate a surrogate "ground truth" for the policy neural network—which can initially be trained in a supervised way to emit an encoding action (i.e. to indicate that an test input should be encoded) at the time-steps identified by the classifier as being most informative. The label produced by the classifier at time t is used by the policy neural network as ground truth for the policy at t−1 since the action is output to be applied to the next frame. Teacher forcing may be used to ensure the actions of the RL neural network at the beginning of training do not hinder the representation learning i.e. the actions sampled from the RL neural network can be overwritten with the ground truth given by the per-frame classifier. For example, let $c_t$ denote the score of the correct class given by a per-frame classifier at time t and $A_k$=arg $\text{top}_k(c_t)$, the set of indices of the top k scores. Then, the imitation label may be given by $l_t=1_{\{t \in A_k\}}$ and the training seeks to minimize $$L = H(y, \hat{y}) = \left\{\frac{1}{N}\right\}\sum_{t=1}^{N} H(l_t, a_{t-1}).$$

After pre-training, supervisor guidance can be removed from the pre-frame classifier and the policy may be fined-tuned using the RL loss.

Figure 4:
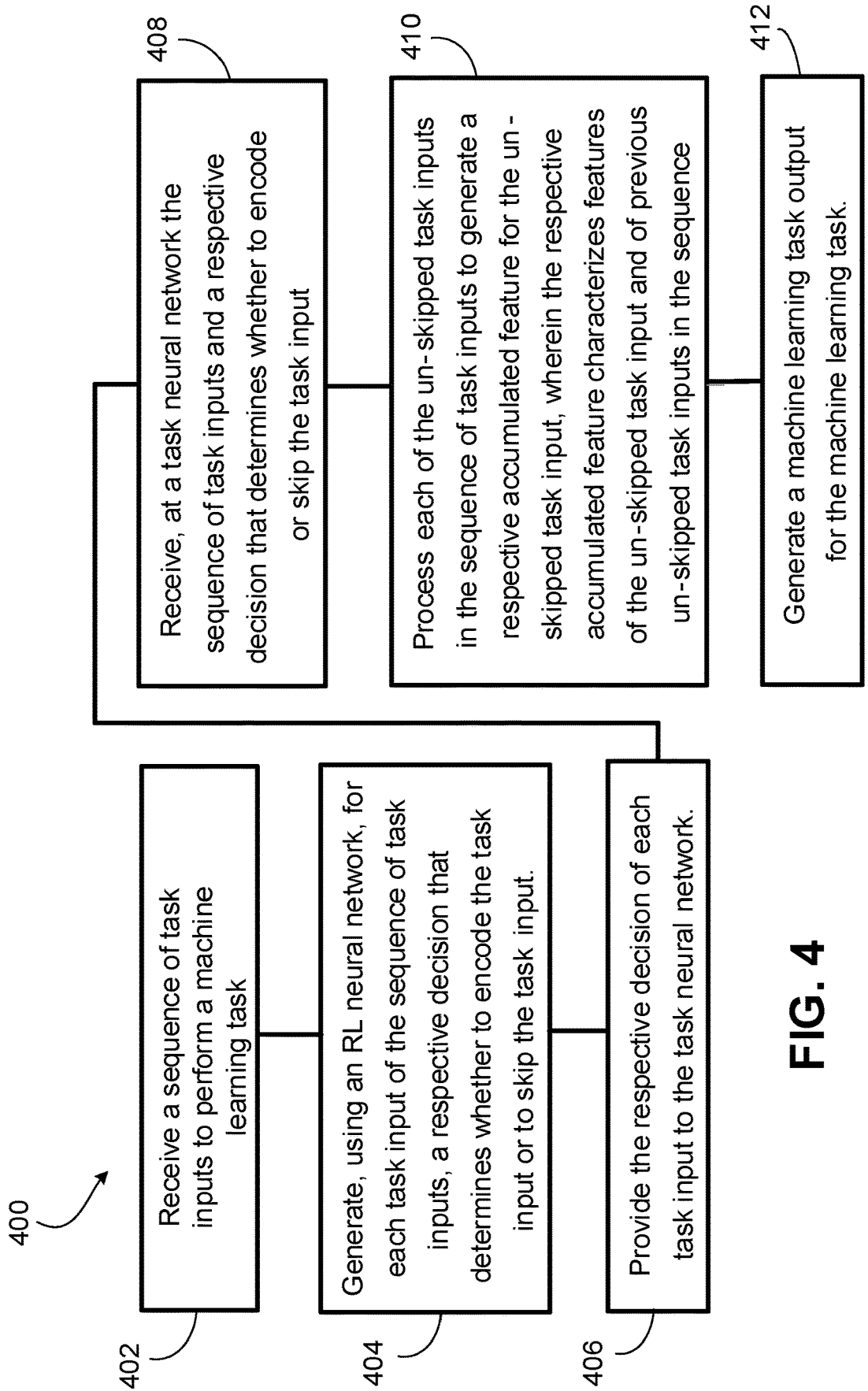
FIG. 4 is a flow diagram of an example process for generating a machine learning task output.

FIG. 4 is a flow diagram of an example process 400 for generating a machine learning task output. The system receives 402 a sequence of task inputs to perform a machine learning task. The sequence of task inputs can be a sequence of video frames and the machine learning task can be a different video processing task, e.g. to predict the topic of the sequence of video frames or to recognize an object depicted in the sequence of video frames.

As another example, the machine learning task is a natural language processing task where the sequence of task inputs is a sequence of text (or other data representing a sample of natural language, such as a speech waveform captured by a microphone) and the task output is a prediction of a topic of the sequence of text a sentiment expressed in the sequence of text, or another output for another natural language processing task.

RL neural network 102 is used to generate 404 for each task input in the sequence of task inputs a respective decision that determines whether to encode or skip the task input. The RL neural network makes the respective decision according a policy which determines whether to encode the task input or skip the task input. For example the policy may determine a reward for the system should the encoder decide not to encode the task.

The RL neural network provides 406 the respective decision of each task input to the task neural network, that is, for each frame whether the task neural network should encode or skip the task.

The task neural network receives 408 the sequence of task inputs and a respective decision from the RL neural network. The decision determines whether to encode or skip the task input.

The task neural network processes 410 each of the un-skipped task inputs in the sequence of task inputs to generate a respective accumulated feature for the un-skipped task input, wherein the respective accumulated feature characterizes features of the un-skipped task input and of previous un-skipped task inputs in the sequence.

The task neural network generates 412 a machine learning task output for the machine learning task based on the last accumulated feature generate for the last un-skipped task input in the sequence.

Alternatively the task neural network may generate a temporary machine learning output based on the respective accumulated feature and generate 412 a machine learning task output for the machine learning task by averaging the temporary machine learning outputs generated for the un-skipped task inputs in the sequence.

In some implementations the received input may part of a classification machine learning task, such as an image processing task, speech recognition task, natural language processing task, or optical character recognition task. In these cases, the generated output may include an output that classifies the received input.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system configured to receive a sequence of task inputs and to perform a machine learning task, the system comprising a reinforcement learning (RL) neural network and a task neural network,
wherein the RL neural network is configured to:
generate, for each task input of the sequence of task inputs, a respective decision that determines whether to encode the task input or to skip the task input, and
provide the respective decision of each task input to the task neural network; and
wherein the task neural network is configured to:
receive the sequence of task inputs,
receive, from the RL neural network, for each task input of the sequence of task inputs, a respective decision that determines whether to encode the task input or to skip the task input,
process each of the un-skipped task inputs in the sequence of task inputs to generate a respective accumulated feature for the un-skipped task input, wherein the respective accumulated feature characterizes features of the un-skipped task input and of previous un-skipped task inputs in the sequence, and
generate a machine learning task output for the machine learning task based on the last accumulated feature generated for the last un-skipped task input in the sequence.

2. The system of claim 1, wherein the sequence of task inputs is a sequence of video frames.

3. The system of claim 2, wherein the machine learning task is to recognize one or more actions performed in the sequence of video frames.

4. The system of claim 1, wherein the task neural network comprises an encoder, an accumulated feature neural network, and a final neural network,
wherein, for each of the un-skipped task inputs, the encoder is configured to:
process the current un-skipped task input to generate an encoded feature representation for the current un-skipped task input, and
provide the encoded feature representation to the accumulated feature neural network;
wherein, for each of the un-skipped task inputs, the accumulated feature neural network is configured to:
process the encoded feature representation of the current un-skipped task input and a previous accumulated feature associated with the previous un-skipped task input to generate a respective accumulated feature for the current un-skipped task input,
generate a feature output from the respective accumulated feature of the current un-skipped task input, and
provide the feature output to the RL neural network, the feature output being used by the RL neural network to generate a next decision for the next un-skipped task input in the sequence; and
wherein the final neural network is configured to process the last accumulated feature to generate the machine learning task output for the machine learning task.

5. The system of claim 4, wherein the encoder is a convolutional neural network.

6. The system of claim 4, wherein the feature output includes a time embedding that identifies the current time step.

7. The system of claim 4, wherein the final neural network is a multilayer perceptron (MLP) neural network.

8. The system of claim 4, wherein:
for each of the un-skipped task inputs in the sequence, the RL neural network is configured to receive, from the task neural network, the feature output generated by the accumulated feature neural network, and to generate a next decision for the next task input in the sequence, and
for each of the skipped task inputs in the sequence, the RL neural network is configured to receive, from the task neural network, the feature output generated by the accumulated feature neural network for the most recent un-skipped task input, and to generate a next decision for the next task input after the skipped task input in the sequence.

9. The system of claim 8, wherein the RL neural network maintains an action space comprising an encode action and a skip action, and wherein the RL neural network is configured to, for each task input in the sequence:
process, using a policy neural network of the RL neural network, the received feature output to generate a corresponding distribution of actions in the action space, and
generate the next decision for the next task input in the sequence by sampling an action from the action space according to the corresponding distribution of actions.

10. The system of claim 8, wherein the RL neural network is configured, during a training phase of the RL neural network, to receive a reward for making the next decision for the next task input.

11. The system of claim 10, wherein the reward for the skip action is greater than the reward for the encode action.

12. The system of claim 11, wherein the loss objective function comprises: (i) a first component that is a cross entropy loss of a ground-truth machine learning task output and a predicted machine learning task output and that measures how well the task neural network is predicting the ground-truth machine learning task output, (ii) a second component that is the expected sum of rewards collected by the RL neural network, and (iii) a third component that is an action exploration entropy.

13. The system of claim 1, wherein the RL neural network and the task neural network are jointly trained to minimize a loss objection function using a stochastic gradient descent method, wherein gradients from the RL neural network are not backpropagated into the task neural network.

14. The system of claim 13, wherein the stochastic gradient descent method is REINFORCE.

15. The system of claim 1, wherein the RL neural network is configured to predict how many more task inputs the task neural network needs to encode until an accuracy of a machine learning task output generated by the task neural network satisfies a threshold.

16. A system configured to receive a sequence of task inputs and to perform a machine learning task, the system comprising a reinforcement learning (RL) neural network and a task neural network,
wherein the RL neural network is configured to:
generate, for each task input of the sequence of task inputs, a respective decision that determines whether to encode the task input or to skip the task input, and
provide the respective decision of each task input to the task neural network; and wherein the task neural network is configured to:
receive the sequence of task inputs,
receive, from the RL neural network, for each task input of the sequence of task inputs, a respective decision that determines whether to encode the task input or to skip the task input,
process each of the un-skipped task inputs in the sequence of task inputs to generate a respective accumulated feature for the un-skipped task input, wherein the respective accumulated feature characterizes features of the un-skipped task input and of previous un-skipped task inputs in the sequence,
for each of the un-skipped task inputs, generate a temporary machine learning output based on the respective accumulated feature; and
generate a machine learning task output for the machine learning task by averaging the temporary machine learning outputs generated for the un-skipped task inputs in the sequence.

17. The system of claim 16, wherein the sequence of task inputs is a sequence of video frames.

18. The system of claim 17, wherein the machine learning task is to recognize one or more actions performed in the sequence of video frames.

19. The system of claim 16, wherein the task neural network comprises an encoder, an accumulated feature neural network, and a final neural network,
wherein, for each of the un-skipped task inputs, the encoder is configured to:
process the current un-skipped task input to generate an encoded feature representation for the current un-skipped task input, and
provide the encoded feature representation to the accumulated feature neural network;
wherein, for each of the un-skipped task inputs, the accumulated feature neural network is configured to:
process the encoded feature representation of the current un-skipped task input and a previous accumulated feature associated with the previous un-skipped task input to generate a respective accumulated feature for the current un-skipped task input,
generate a feature output from the respective accumulated feature of the current un-skipped task input, and
provide the feature output to the RL neural network, the feature output being used by the RL neural network to generate a next decision for the next un-skipped task input in the sequence; and
wherein the final neural network is configured to compute the machine learning task output based on the temporary machine learning outputs.

20. The system of claim 19, wherein, for each of the un-skipped task inputs, the accumulated feature neural network is configured to generate the feature output from the respective accumulated feature of the current un-skipped task input by:
concatenating the encoded feature representation of the current un-skipped task input and the respective accumulated feature through a skip connection to generate an adjusted accumulated feature, and
generating the feature output from the adjusted accumulated feature.

21. The system of claim 19, wherein the encoder is a convolutional neural network.

22. The system of claim 19, wherein the feature output includes a time embedding that identifies the current time step.

23. The system of claim 19, wherein the final neural network is a multilayer perceptron (MLP) neural network.

24. The system of claim 19, wherein:
for each of the un-skipped task inputs in the sequence, the RL neural network is configured to receive, from the task neural network, the feature output generated by the accumulated feature neural network, and to generate a next decision for the next task input in the sequence, and
for each of the skipped task inputs in the sequence, the RL neural network is configured to receive, from the task neural network, the feature output generated by the accumulated feature neural network for the most recent un-skipped task input, and to generate a next decision for the next task input after the skipped task input in the sequence.

25. The system of claim 24, wherein the RL neural network maintains an action space comprising an encode action and a skip action, and wherein the RL neural network is configured to, for each task input in the sequence:
process, using a policy neural network of the RL neural network, the received feature output to generate a corresponding distribution of actions in the action space, and
generate the next decision for the next task input in the sequence by sampling an action from the action space according to the corresponding distribution of actions.

26. The system of claim 24, wherein the RL neural network is configured, in a training phase, to receive a reward for making the next decision for the next task input.

27. The system of claim 26, wherein the reward for the skip action is greater than the reward for the encode action.

28. The system of claim 27, wherein the loss objective function comprises: (i) a first component that is a cross entropy loss of a ground-truth machine learning task output and a predicted machine learning task output and that measures how well the task neural network is predicting the ground-truth machine learning task output, (ii) a second component that is the expected sum of rewards collected by the RL neural network, and (iii) a third component that is an action exploration entropy.

29. The system of claim 26, wherein the RL neural network and the task neural network are jointly trained to minimize a loss objection function using a stochastic gradient descent method, wherein gradients from the RL neural network are not backpropagated into the task neural network.

30. The system of claim 29, wherein the stochastic gradient descent method is REINFORCE.

31. The system of claim 16, wherein the RL neural network is configured to predict how many more task inputs the task neural network needs to encode until an accuracy of a machine learning task output generated by the task neural network satisfies a threshold.

* * * * *